B. B. KELLER.
SAFETY RADIUS ROD.
APPLICATION FILED JULY 30, 1920.
1,374,016.
Patented Apr. 5, 1921.
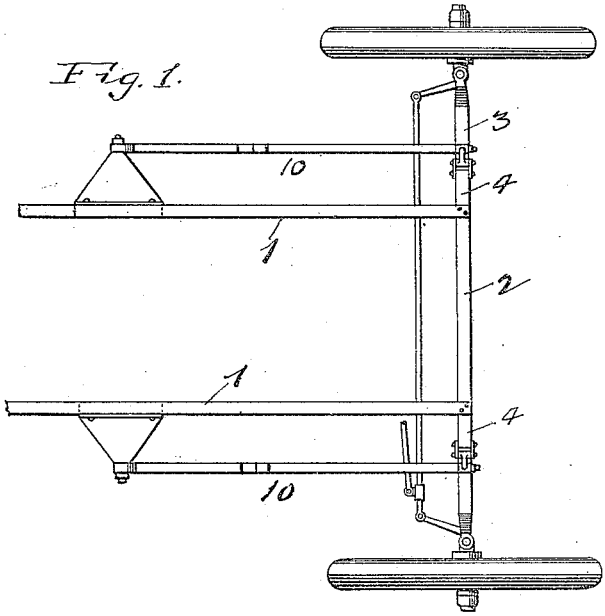
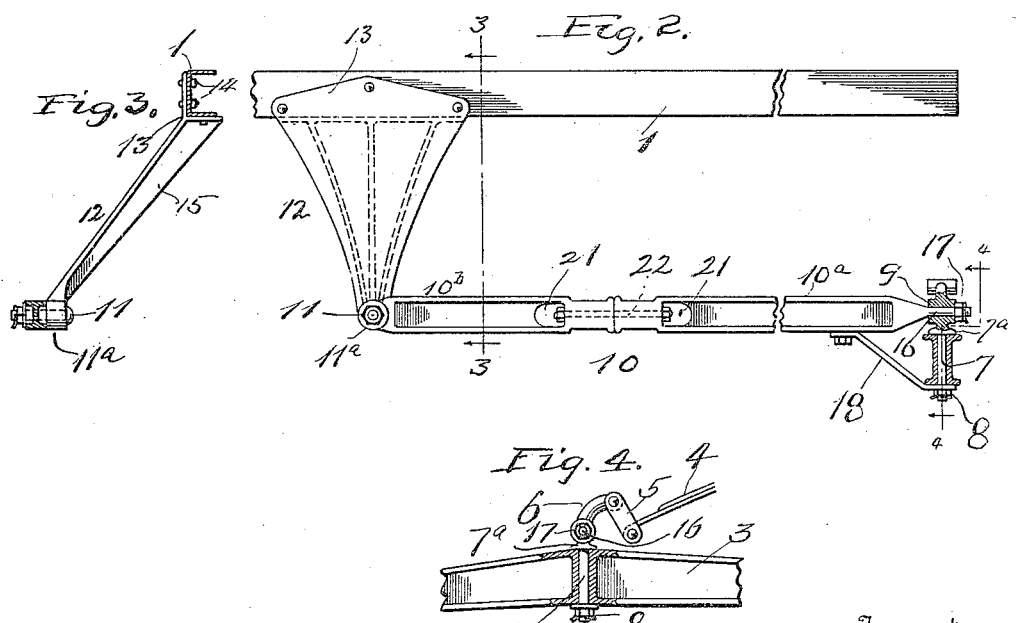
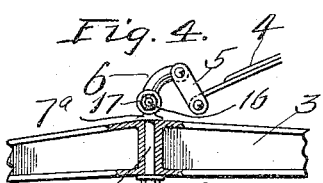
Inventor
Bruce B. Keller.
By Mason, Fenwick & Lawrence
Attorneys

UNITED STATES PATENT OFFICE.

BRUCE B. KELLER, OF SCRANTON, PENNSYLVANIA.

SAFETY RADIUS-ROD.

1,374,016.  Specification of Letters Patent.  Patented Apr. 5, 1921.

Application filed July 30, 1920. Serial No. 400,100.

*To all whom it may concern:*

Be it known that I, BRUCE B. KELLER, citizen of the United States, residing at Scranton, in the county of Lackawanna and State of Pennsylvania, have invented certain new and useful Improvements in Safety Radius-Rods; and I do hereby declare the following to be a full, clear, and exact description of the invention, such as will enable others skilled in the art to which it appertains to make and use the same.

This invention relates to vehicles; and more particularly to road vehicles having their front axles provided with independently swiveled steering wheels at their extremities. It relates more particularly to a radius rod for bracing the front axle from the under frame so as to prevent any skewing motion of the axle parallel with the under frame, but to permit freedom of vertical rocking movement.

It is the purpose of my invention to provide an efficient radius rod particularly adapted to that type of vehicle where a leaf spring, transverse of the under frame, supports the under frame on the axle and it is therefore necessary to brace said axle horizontally but allow freedom of vertical movement.

The invention consists, generally, in a radius rod extending fore and aft or parallel with the under frame and having a universally jointed connection between said under frame and the axle.

It consists also in details of construction more fully set forth in the following description, illustrated in the accompanying drawings and defined in the appended claims.

In the drawings:

Figure 1 is a top plan view of so much of the under frame of a motor vehicle and the axle as is necessary to illustrate my invention;

Fig. 2 is a side elevation of the improved radius rod and its connection to the under frame and axle, the axle being shown in section;

Fig. 3 is a section on the line 3—3 of Fig. 2, viewed in the direction of the arrows;

Fig. 4 is a detail showing a fragment of the axle partly in section on the line 4—4 of Fig. 2 and the device to which the front end of the radius rod is connected.

In the drawings; numeral 1 designates the side beams of an under frame, 2 the front cross beam thereof, 3 a front axle, 4 the ends of a leaf spring, which, in the type of vehicle illustrated, has its middle point connected to a member (not shown) interposed between the cross beam 2 and the spring. Each end of the spring 4 may be supported on a link 5 which depends from the upper end of an attachment that comprises a curved link suspending portion 6, a shank 7 passed through an orifice in the axle and rigidly secured thereto by means of a shoulder $7^a$ and a nut or other securing member 8, and a boss 9 disposed between the curved supporting portion 6 and the shoulder 7, said boss 9 being perforated transversely of the axle and adapted to receive the front end 16 of a radius rod 10.

The rear end of the radius rod 10 is pivoted by a bolt 11, or the like, to the lower outer end of a bracket 12. The said bracket 12 comprises an angular seat 13 formed at its upper end that fits snugly against a beam 1 to which the said bracket is secured by bolts 14. The bracket 12 is made of considerable width at that portion which is bolted to the beam 1 in order to stiffen and strengthen it. From the wide seat 13 the bracket tapers, extending downward and outward, at an oblique angle, as indicated in Fig. 3. It is strengthened on its under side by webs 15 and has a narrow lower end provided with a boss $11^a$ through which the said bolt 11 passes. The radius rod 10 is hinged on the bolt 11 so that its forward end may move freely in a vertical plane.

The radius rod 10 is preferably composed of two sections $10^a$ and $10^b$. The front section $10^a$ is reduced at its forward end, as shown at 16, said end 16 being passed through the hole in the perforated boss 9 and secured therein by a nut 17 threaded to its extremity. Having its rearward end bolted to the under side of the section $10^a$ is a brace bar 18, the front end of which is bolted to the under side of the axle by means of the shank 7 and the nut 8 thereon. The rear end of the section $10^a$ of the radius rod 10 is abutted against the front end of the section $10^b$ thereof and the said two sections $10^a$ and $10^b$ are swiveled together. In the construction shown, alined holes are drilled into the ends of said sections $10^a$ and $10^b$ each terminating in a transverse opening 21 disposed a little back from the adjoining end of said sections respectively. A bolt 22 passed through said holes is provided with headed fastenings, such as nuts, or a head and a nut, whereby the two parts 10ª and 10ᵇ may be held together so as to form a swiveled joint, the parts swiveling about the bolt 22. The preferable cross sectional form of the radius rod is that of an I-beam so as to afford strength without excessive weight.

In practice a pair of brackets 12 will be bolted, one to each lateral beam 1 of the under body, and the radius rod will be hinged to the lower outer end of each bracket and rigidly connected to the front axle by the means shown.

My improvement is particularly designed for use on a Ford car or other car of the type that has a leaf spring supporting the front portion of the under frame, said spring being arranged longitudinal of the axle and transverse of the under frame. By reason of the want of support afforded by the spring so disposed to fore and aft forces acting on the axle, it is essential to provide some horizontal bracing for the axle without interfering with the vertical rocking motion thereof. My improved radius rod provides for a dual fore and aft thrust and pull to hold the axle against horizontal rocking movements and therefore most effectively resists strains in that direction. By means of the universal joint in the radius rod, consisting of the swivel, and the hinge at the rear end of the rod, freedom of movement of the axle up and down and freedom of vertical rocking, as may take place when one wheel, only, runs over an elevation, is provided for.

Having described my invention in such manner as to enable those skilled in the art to make and use the same, what I claim and desire to secure by Letters Patent is:

1. In a vehicle, the combination of an under frame with parallel side beams, an axle, a spring supporting the under frame on the axle, a bracket on each side beam spaced from the axle, radius rods each having one end secured to one of said brackets, respectively, and its other end secured to the axle, and a universal jointed connection for each radius rod.

2. In a vehicle, the combination with an under frame with parallel side beams, an axle and a spring supporting the under frame on said axle; of a bracket secured to a side beam, and extending downward and outward, a radius rod having its rear end connected to one of said brackets, and its forward end connected to the axle, and a universal jointed connection for the radius rod.

3. In a vehicle, the combination with an under frame comprising parallel side beams, an axle, and a spring supporting said under frame on said axle, of a bracket secured to a side beam of the under frame, a radius rod having its rear end hinged to said bracket on a transverse pivot, its front end secured to the axle, and a swivel joint in the radius rod.

4. In a vehicle, the combination of an under frame comprising parallel side beams, an axle and a spring supporting said under frame on said axle; the combination of a bracket secured to a side beam, a radius rod having its rear end connected to said bracket and its front end connected to the upper side of the axle, a brace secured to the radius rod and to the under side of the axle, and a universal jointed connection for the radius rod between the brace and the bracket.

5. In a vehicle, the combination of an under frame comprising parallel side beams, an axle, and a spring supporting said under frame on said axle; a spring support having a shank passing through the axle, a bracket secured to a side beam, a radius rod having its rear end connected to said bracket and its front end secured to said spring support above the axle, a brace having its rear end secured to the radius rod and its front end secured to the under side of the axle by the shank of said spring support, and a universal jointed connection for the radius rod between said brace and said bracket.

6. In a vehicle, a radius rod adapted to be interposed between the front axle and a part rigid with the under frame, said rod comprising two parts swiveled together end to end and a hinge joint at its rear end.

7. In a vehicle, a radius rod comprising two members swiveled together end to end, said swiveling ends having alined bolt holes terminating in transverse openings and a bolt extending through the bolt holes and having its ends terminating in the transverse opening, and fastening heads on the bolt ends.

In testimony whereof I affix my signature.

BRUCE B. KELLER.